Patented July 22, 1952

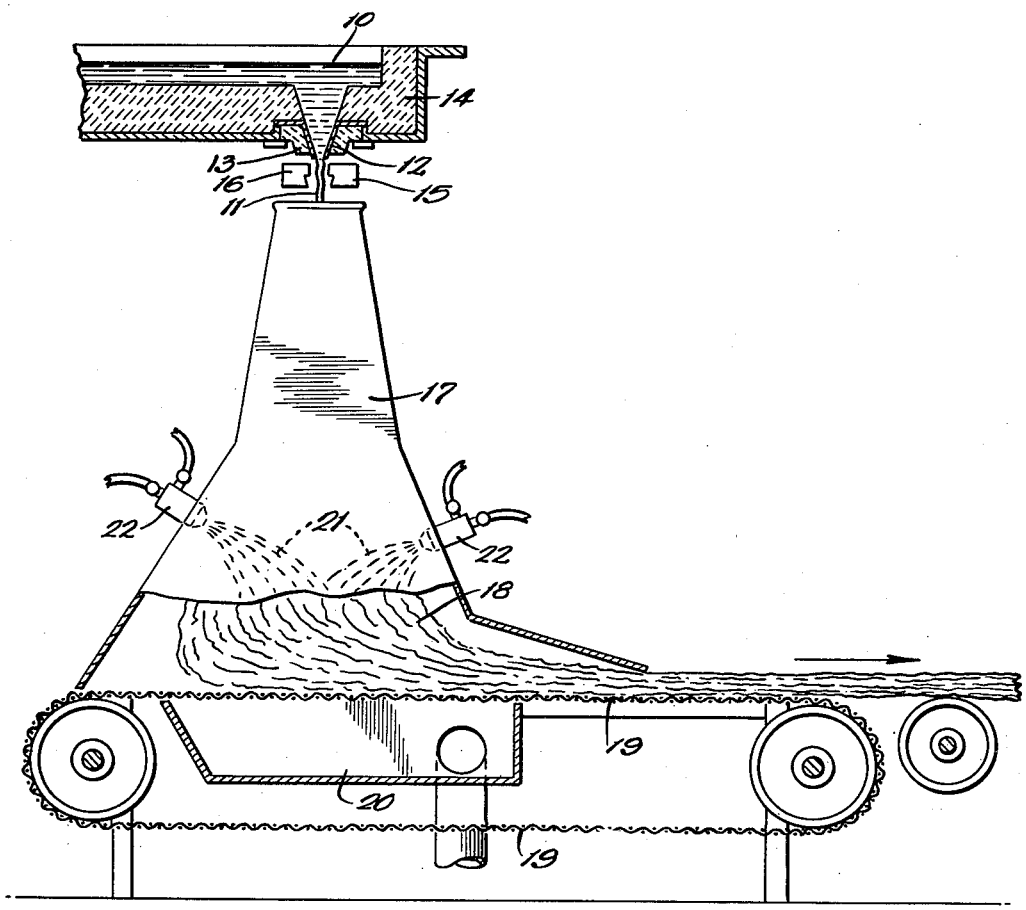

2,604,427

UNITED STATES PATENT OFFICE 2,604,427

BONDED MINERAL FIBER PRODUCTS AND PROCESS OF PREPARING THE SAME

Marshall C. Armstrong, Hebron, and Eugene M. Lockhart, Newark, Ohio, assignors to Owens-Corning Fiberglas Corporation, Toledo, Ohio, a corporation of Delaware Application August 2, 1949, Serial No. 108,086

8 Claims. (Cl. 154—101)

This invention relates to integrated structures of glass wool fibers employing bonding agents to impart greater self-sufficiency to the composite mass and more rigidly to secure the fibers one to another in the manufacture of insulation and structural board products which range in density from ½ pound per cubic foot for insulation to 20 pounds per cubic foot for board and the like.

It is an object of this invention to produce and to provide a method for manufacturing bonded structures of glass wool fibers characterized by improved binder flow, binder distribution, and curing characteristics to enhance the processing technique, and improved moisture resistance and non-inflammability in the final product.

Other objects and advantages of this invention will hereinafter appear, and for purposes of illustration but not of limitation, apparatus for manufacturing bonded glass wool fibers is shown in Figure 1 of the accompanying drawing.

In a conventional system of manufacturing glass wool fibers, molten glass 10 flows in a plurality of streams 11 from the nipple 12 of a bushing 13 provided in the base of a glass melting furnace 14. As the molten glass streams 11 pass between cooperating converging blower elements 15 and 16, high pressure steam, air or gas, directed onto the molten glass streams at a slight angle therewith, grip the glass streams and cause their attenuation at high speed into relatively small dimension fibers. This briefly describes the manufacture of staple glass fibers.

The attenuated fibers are blown into a collecting chamber 17 of increasing area which causes the deceleration of gaseous and fiber flow with corresponding turbulent movement and uniform fiber distribution. Under such circumstances, the fibers 18 rain down slowly through the collecting chamber 17 and deposit in haphazard arrangement to form a layer upon a traveling foraminous belt 19 which may have a suction box 20 arranged therebeneath more substantially to hold the fibers in their deposited position. It will be manifest that the thickness of the deposited fibrous layer will depend chiefly upon the rate of feed of molten glass, the number of orifices in the fiber forming system, and upon the rate of linear travel of the normally endless collecting belt.

Unavoidably, there are times when molten glass, issuing from the melting furnace, is not attenuated by the gaseous blast and, under such circumstances, the molten gob falls through the chamber and finds its way amongst the layer of deposited fibers. Since glass fibers are in themselves inert with respect to the temperatures to which they might be exposed by the presence of the gob, no harmful effects result from such unavoidable inclusions.

But in most applications for glass wool fibers, a binder is used to secure the deposited fibers one to another, as in the manufacture of bonded wool products wherein integrity and dimension are important characteristics. As shown in the drawing, binder may be incorporated with the fibers as they are rained down from above through the collecting chamber by injecting a spray 21 of the diluted binder composition from spray guns 22 located in spaced-apart relation in the chamber. Alternatively, the binder may be later supplied to the collected layer of fibers by a suitable dip or flow coat process.

In the past, phenol formaldehyde type resins have constituted the principal bonding agent for glass wool fibers. Suitable phenol formaldehyde resinous materials are usually applied in an intermediate stage of polymeric growth and they are subsequently advanced to a cured stage upon activation by heat or catalyst, with or without the application of pressure for densification of the composite mass into a board or molded insulation.

The phenol formaldehyde reaction is exothermic, that is, heat is given off by the reaction of the resinous material to an advanced stage of polymeric growth. It is conceivable, then, that the exothermic reaction will continue in the vicinity of an accidentally included hot gob to a point far and beyond that which was contemplated in the manufacturing process. In view of the fact that the surrounding glass wool fibers constitute excellent heat insulation, the heat of the gob and the heat given off by the reaction will become cumulative within a confined area until such temperatures are attained as will cause thermal decomposition of the organic resin forming material to release various decomposition products, including vapors which may have an ignition temperature corresponding to the temperature of the surrounding medium. When this condition is reached, the vapors will burst into flame and the conflagration will spread to the surrounding substances. The quiescent stage before actual ignition is hereinafter referred to as "punking." It may last for a considerable length of time with the result that the ignition of the entire shipment or load may occur in the warehouse, and it has even occurred after the material has been dispatched in railroad cars for use at a distant station.

Punking and burning have occurred with binder compositions wherein the phenol formaldehyde resin is admixed or extended with as much as 50 per cent by other resinous materials, such as urea formaldehyde or the residue remaining after the separation of refined rosin from the resinous extract of pine wood (Vinsol).

In the attempt to eliminate these dangerous, costly and embarrassing mishaps, adhesives have been formulated in which urea formaldehyde resins replace all or the greater portion of the phenolic resin. In certain phases improvement has been secured but binder compositions based on urea formaldehyde resin have many of the same and additional objectionable characteristics. For example, they do not have adequate moisture resistance for all uses of the bonded fibrous material, and their curing rate is so rapid and uncontrollable that it is difficult to make full use of the resinous material as a binding agent and to secure uniform distribution. This is because the resinous material sets before full impregnation or distribution is achieved, that is, before it has become sufficiently concentrated at the juncture of the fibers to effectively secure the fibers one to another.

In accordance with this invention, there is provided a binder composition characterized by its outstanding resistance to punking and combustion while having the desirable characteristics of flow in partially cured state coupled with excellent moisture resistance in its cured condition. A binder composition embodying features of this invention constitutes the product resulting from the thermal treatment of a dicyandiamide formaldehyde resin in partially reacted, water soluble stage in admixture with a phenol formaldehyde resin advanced to an intermediate stage of polymeric growth, that is an "A" or "B" stage resin, although a resin in the "A" stage is preferred. The dicyandiamide formaldehyde resin may also be in "B" stage; that is, in the stage where it is water-insoluble but still incompletely reacted.

The desirable characteristics with respect to flow, curing rate, and lack of attack on the glass fibers are believed to result in part from the fact that dicyandiamide formaldehyde readily cures on the alkaline side. This is the most desirable environment for the phenol formaldehyde resin, particularly in comparison with the acid conditions incident with the use of urea formaldehyde. The binder formed of dicyandiamide formaldehyde and phenol formaldehyde has increased moisture resistance such that the composition is better adapted for use in combination with glass wool fibers in the manufacture of bonded or molded glass wool products. Even when phenol formaldehyde resin is present in substantial quantity, the non-punking and non-inflammable characteristics are effectively maintained.

The dicyandiamide formaldehyde component may be present in the binder composition in amounts ranging from 25 to 75 per cent solids by weight depending primarily on the weight or density of the ultimate product and the type of glass fiber. For example, the amount of dicyandiamide formaldehyde may go to the lower limit of concentration with glass mats having densities of less than 6 pounds per cubic foot but when greater densities are desired, it is best to use more than 40 per cent by weight dicyandiamide formaldehyde. Best all around use is made of a composition based on equal parts by weight dicyandiamide formaldehyde and phenol formaldehyde resin. The upper limit of dicyandiamide formaldehyde concentration is that at which a suitable adhesive film can still be formed, because unlike urea dicyandiamide formaldehyde resin alone is incapable of forming a film or functioning as an adhesive to required extent.

Although phenol formaldehyde resinous materials are preferred for use in combination with dicyandiamide formaldehyde, other related thermosetting phenol aldehyde resin forming substances may be used, such as the reaction products of an aldehyde with cresylic acids, resorcinol, substituted phenols and the like. These are usually applied to the glass fibers in an intermediate stage of polymeric growth, generally referred to as the water soluble "A" stage resins, or as an advanced water insoluble "B" stage resin which is dispersible in water or soluble in solvents of the type recognized in the art.

Since dicyandiamide formaldehyde and "A" stage phenolic resins are soluble in water, a very stable composition can be prepared simply by combining the proper amount of ingredients in water solution. Vinsol in aqueous emulsion may be used to extend the resin solids by amounts up to 15 per cent by weight. Further to stabilize the phenolic resin component and to provide a proper environment for the condensation polymerization reaction, water soluble alkaline substances, such as ammonia, may be incorporated into the treating composition. Excellent use has been made of a 28 per cent aqueous ammonia solution which is added to the composition to be present in amounts ranging up to 10 per cent by weight calculated on the basis of the phenolic resin.

To give the glass fibers lubricity as well as protection against destruction ordinarily effected by mutual abrasion or other abrasion, it is preferable also to incorporate into the treating composition a lubricant of the type mineral oil, sulfonated oils, such as those described in the Williams and Bone Patents Nos. 2,107,284 and 2,083,132; cationic-active amines having more than ten carbon atoms, such as those described in the Sloan Patent No. 2,356,542; organo-silicon fluids and compounds and Werner complex compounds having more than eight carbon atoms in the acido group coordinated with the nuclear metallic atom, such as described in the patent to Iler No. 2,773,040. It is sufficient when the amount of lubricant constitutes one per cent by weight of the treating composition, although as much as two per cent or more might be used.

Application of the adhesive composition is usually made to the staple glass fibers as they are rained down from above onto the collecting belt. Thereafter, the treated layer of glass fibers, the thickness of which may be determined by the rate of travel of the collecting belt, and subsequently by the amount of compression applied to the deposited layer during the curing cycle, is led through a drying and baking oven wherein the diluent of the treating composition is driven off and the resin which remains is converted to the cured or set condition. The fibers in the fabric are thus secured one to another so that they retain the relationship to which they have been formed during cure, as by compression to provide products of predetermined density. Naturally, the strength of the formed fabric and its permanence of dimension will vary to some extent with the amount of binder present. For low density products on the order of ½ to 4 pounds per cubic foot, the amount of resin may range from 1.5 to 4 per cent by weight. Up to 10 per cent binder concentration in the product is suitable for insulation board having a density between 6 and 10 pounds per cubic foot, and amounts up to 16 per cent binder solids are often used in the manufacture of hard structural board.

The described ratio of fibers to adhesive or binder apply mostly to wool-type glass fibers of the standard variety having a fiber diameter between 0.00010 and 0.008 inch. With fine glass fibers of less than 0.00010 inch, the resin content may be materially increased up to 30 per cent or even more since the available surfaces in the fabric have been tremendously increased. In compositions such as these wherein more than 6 per cent binder is used, it is desirable to have at least 40 per cent dicyandiamide formaldehyde in the binder composition.

The following formulations are representative of suitable treating compositions for manufacturing bonded structures of glass fibers.

*Example 1*

5% "A" stage phenol formaldehyde
5% dicyandiamide formaldehyde
1% ammonia based upon the amount of phenol formaldehyde resin
1% mineral oil
Remainder water

*Example 2*

3% phenol formaldehyde "A" stage resin
2.7% dicyandiamide formaldehyde
0.5% Vinsol
0.3% ammonia (28% solution in water)
1% sulfonated mineral oil emulsion
Remainder water

*Example 3*

10% phenol formaldehyde "A" stage resin
15% dicyandiamide formaldehyde
1% ammonia in aqueous 28% solution
1% mineral oil
Remainder water

*Example 4*

2% phenol formaldehyde "A" stage resin
1% dicyandiamide formaldehyde
0.2% ammonia in aqueous 28% solution
1% dimethyl polysiloxane fluid 500 ctsk. viscosity (DC 200 oil)
Remainder water Formulations of the type 1, 2 and 4 may be applied from one or more spray guns arranged in the fiber collecting hood to inject a mist of the binder composition which becomes uniformly distributed with the fibers as they collect upon the moving belt. Instead of supplying all or part of the binder composition to the fibers as they are rained down from above, the binder composition may be incorporated with the layer of collected fibers by a dip, spray, or flow-coat process well known in the impregnating and coating arts.

The collected fibers are then advanced into a curing oven maintained at a temperature calculated to drive off the diluent and cure the resinous binder. Not infrequently, the layer is given a slight compression for the purpose of densification and binder distribution. Upon cure of the resin the fibers are secured together to form a resilient product of substantially fixed dimension. Because of the dicyandiamide formaldehyde, the cure in the drying oven is sufficiently slow to permit drying and then cure under compression without fear of pre-cure at elevated temperatures such as might militate against the desirable migration of the binder to the junctures of the fibers where it is more able to fulfill the binding action for which its use is intended. For purposes of illustration, suitable drying and curing conditions for the described formulations include the range of 5 to 30 minutes at 250° to 400° F. depending primarily upon the ratio of dicyandiamide formaldehyde resin to phenolic resin and the type of catalyst employed.

The formulation of Example 3 is designed primarily for use with very fine glass fibers in the manufacture of bonded structures. The amount of resinous material which is ultimately deposited may range up to 16 per cent by weight of the finished product and still give a product which is relatively soft and flexible but is still resilient and of fixed dimension.

It will be understood that numerous changes may be made in the formulation of the described materials and their method of incorporation with glass fibers without departing from the spirit of the invention, especially as defined in the appended claims.

We claim:

1. A fibrous structure comprising glass fibers bonded into a composite mass with the product resulting from the advancement while on the fibers of a mixture of 25 to 75 parts by weight dicyandiamide formaldehyde in an intermediate stage of polymeric growth and 75 to 25 parts by weight of a heat hardenable phenolic resin-forming material.

2. A bonded fibrous structure comprising haphazardly arranged glass fibers, and a bonding agent securing the fibers together, said bonding agent being the thermal product of dicyandiamide formaldehyde in an intermediate stage of polymeric growth in admixture with a heat hardenable phenol formaldehyde resin-forming material, the materials being present in the ratio of 25 to 75 parts by weight dicyandiamide formaldehyde to 75 to 25 parts by weight phenol formaldehyde.

3. A fibrous structure comprising glass fibers bonded into a composite structure of predetermined density with the product of the thermal treatment of a mixture of partially reacted dicyandiamide formaldehyde and a heat hardenable phenol formaldehyde resin, the materials being present in the ratio of 25 to 75 parts by weight dicyandiamide formaldehyde to 75 to 25 parts by weight phenol formaldehyde, and lubricated with about ½ to 2 per cent of an oleaginous lubricant incompatible with the said product.

4. A fibrous structure comprising glass fibers bonded into an integral mass by the product resulting from the conversion in the presence of alkaline catalyst to solid infusible state of a mixture of 25 to 75 parts by weight of partially reacted dicyandiamide formaldehyde and 75 to 25 parts by weight of a heat hardenable phenol formaldehyde resin and the residue remaining after the extraction of rosin from the resinous extract of pine wood and which may be present in amounts ranging up to equal proportions by weight of the phenol formaldehyde resin.

5. A fibrous structure comprising glass fibers, a bonding agent for imparting mass integrity to the fibers and consisting essentially of 2 to 30 per cent by weight of the product of the thermal treatment of dicyandiamide formaldehyde with a heat hardenable phenol formaldehyde resin present in the ratio of 25 to 75 parts dicyandiamide formaldehyde and 75 to 25 per cent by weight phenol formaldehyde, and less than 2 per cent of a lubricant which is incompatible with the bonding agent.

6. A fibrous structure comprising glass fibers having a diameter less than about 0.008 inch, 1 to 16 per cent by weight of a bonding agent consisting essentially of dicyandiamide formaldehyde and a heat hardenable phenol formaldehyde reacted on the alkaline side while distributed with the fibers to advanced stages of polymeric growth and present in the ratio of 25 to 75 parts by weight dicyandiamide formaldehyde to 75 to 25 parts by weight phenol formaldehyde, and less than 2 per cent of a lubricant which is incompatible with the bonding agent distributed over the glass fiber surfaces.

7. A fibrous structure as claimed in claim 5 in which the ratio of dicyandiamide formaldehyde to phenol formaldehyde exceeds 4 to 6 ratio when the concentration of reaction product in the composite structure exceeds 6 per cent.

8. The process of making bonded glass fibrous structures which comprises distributing through a mass of fibers a mixture of dicyandiamide formaldehyde in liquid state admixed with phenol formaldehyde resin in liquid state, and heating the mass to a temperature of 250° to 400° F. for a time ranging from 5 to 30 minutes, the resinous materials under these conditions having time sufficient to flow to the glass fiber intersections before being cured to non-flowable state.

MARSHALL C. ARMSTRONG.
EUGENE M. LOCKHART.

REFERENCES CITED

The following references are of record in the file of this patent:

UNITED STATES PATENTS

| Number | Name | Date |
| --- | --- | --- |
| 1,775,135 | Nakamura | Sept. 9, 1930 |
| 1,812,374 | Ripper | June 30, 1931 |
| 2,260,187 | Miller | Oct. 21, 1941 |
| 2,288,072 | Collins | June 30, 1942 |
| 2,335,102 | Bergin et al. | Nov. 23, 1943 |
| 2,488,034 | Pingree | Nov. 15, 1949 |

FOREIGN PATENTS

| Number | Country | Date |
| --- | --- | --- |
| 476,043 | Great Britain | Nov. 29, 1937 |
| 498,165 | Great Britain | Jan. 4, 1939 |